No. 668,622. Patented Feb. 26, 1901.
W. R. BOWKER.
SECONDARY BATTERY.
(Application filed Feb. 15, 1900.)
(No Model.)
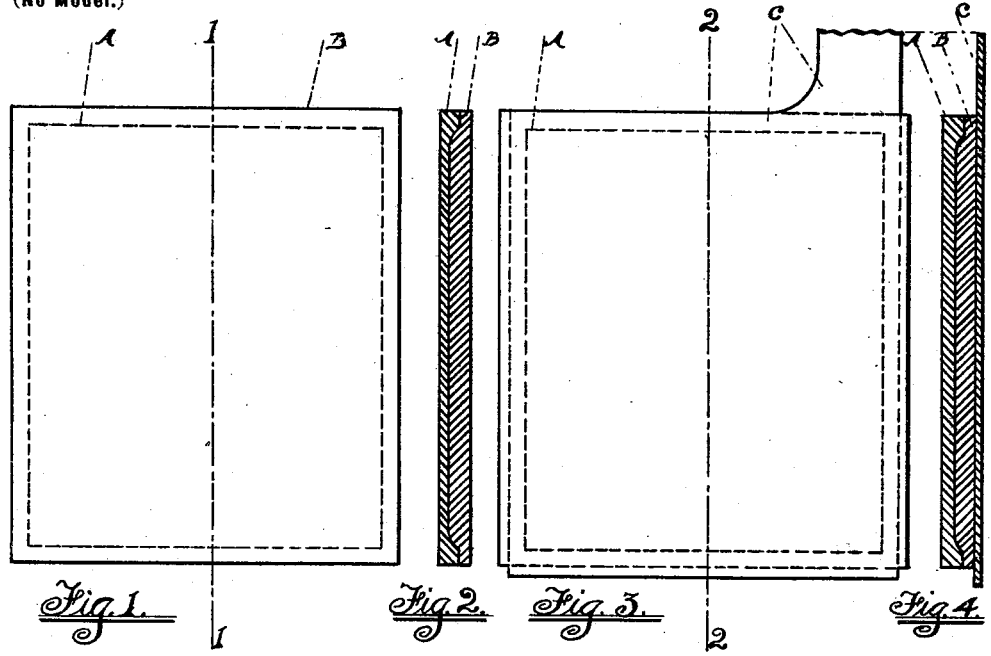
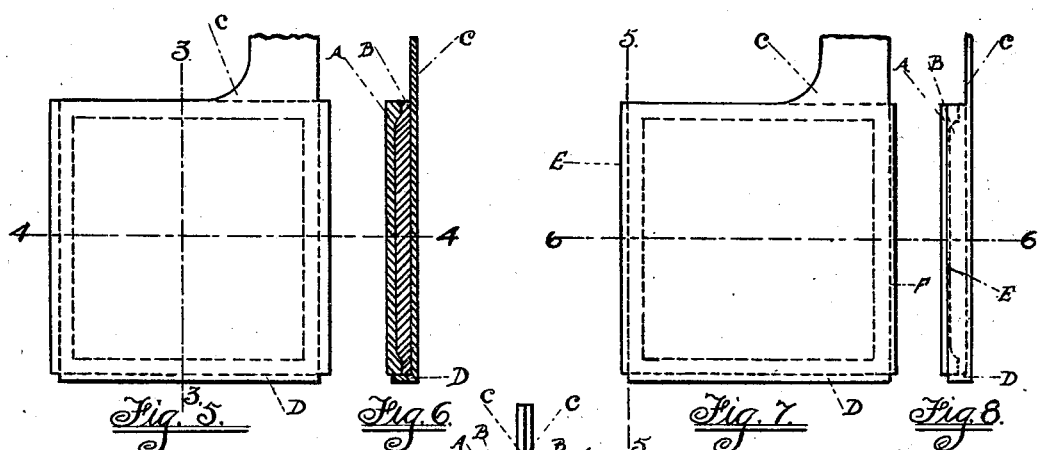
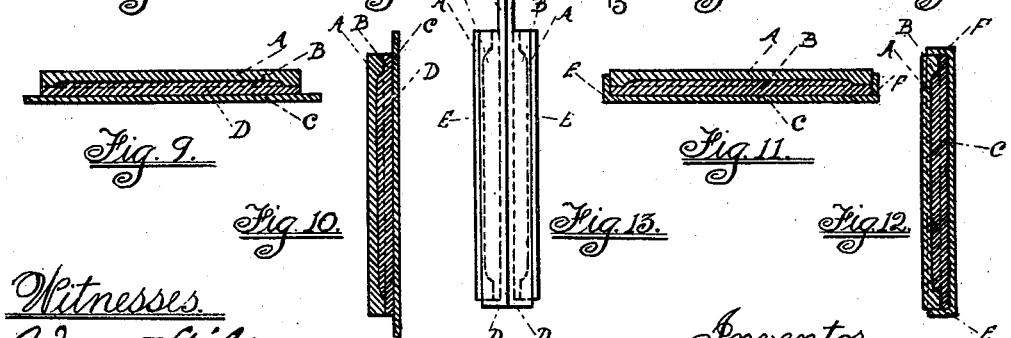
Witnesses
Wm Hilton
Thomas Rodger
Inventor
William Rushton Bowker.

UNITED STATES PATENT OFFICE.

WILLIAM RUSHTON BOWKER, OF WALTHAM, MASSACHUSETTS.

SECONDARY BATTERY.

SPECIFICATION forming part of Letters Patent No. 668,622, dated February 26, 1901.

Application filed February 15, 1900. Serial No. 5,349. (No model.)

*To all whom it may concern:*

Be it known that I, WILLIAM RUSHTON BOWKER, a citizen of the United States, and a resident of Waltham, Middlesex county, Massachusetts, have invented certain new and useful Improvements in Electric Storage Batteries, of which the following is a specification.

My invention relates to the construction or form given to the conducting or current-collecting plate, sheet, or strip used in electric storage batteries, more particularly those storage batteries in which the active material is supported in a receptacle, vessel, or chamber as distinguished from those batteries in which the active material is supported in and by the conducting or current-collecting plate itself.

The object of my invention is to provide a means to prevent the falling out or loss of the active material from its supporting receptacle, chamber, or vessel, or, in other words, to effectually lock up or inclose the active material in its supporting vessel, chamber, or receptacle. This object I attain by the construction or form shown in the accompanying drawings, in which—

Figure 1 is a front elevation of the support-receptacle and active material. Fig. 2 is a cross-sectional side elevation along line 1 1 of Fig. 1. Fig. 3 is a front elevation of the support-receptacle, the active material, and the conducting or electric-current-collecting plate, sheet, or strip. Fig. 4 is a cross-sectional side elevation of same along line 2 2 of Fig. 3. Fig. 5 is a front elevation of the support-receptacle, active material, and the conducting plate or sheet, with the lower edge D turned under. Fig. 6 is a cross-sectional side elevation of same along line 3 3 of Fig. 5. Fig. 7 is a front elevation of the support-receptacle, active material, and the conducting plate or sheet, with the lower or bottom edge D turned under and the side edges E and F turned over. Fig. 8 is a cross-sectional end elevation of same along line 5 5 of Fig. 7. Fig. 9 is a cross-sectional plan view of Fig. 5 along line 4 4 of Fig. 5. Fig. 10 is a cross-sectional plan view of Fig. 6 along line 4 4 of Fig. 6. Fig. 11 is a cross-sectional plan view of Fig. 7 along line 6 6 of Fig. 7. Fig. 12 is a cross-sectional plan view of Fig. 8 along line 6 6 of Fig. 8. Fig. 13 is a sectional end elevation of a pair of receptacles, active material, and conducting-plates similar to Fig. 8.

In the state of the art at the present time the electric storage batteries mostly used and the most practical commercially are manufactured or formed by two different and distinct methods: first, the Planté method, the principle of which consists in taking two sheets, rolls, or coils of lead, placing them in a suitable electrolyte, and sending a suitable strength of current of electricity for a long period of time from one lead sheet or plate to the other through the electrolyte, with suitable reversals or change of direction of the electric current at suitable intervals, the object of which is to form certain lead oxids and spongy metallic lead on the positive and negative plates, respectively. The other method is known as the "Faure" type of cell or storage battery, the principle of which consists of taking a lead plate and casting or punching suitable indentations, holes, or burs on same, in which indentations and holes is applied by pressure or otherwise a paste or mixture of lead oxids, such as red lead or litharge, known as the "active material." In this type of storage battery the active material is supported by the conducting or current-collecting plate itself. There is yet another type of storage battery, in which the active material is applied to and supported by a porous receptacle, vessel, or chamber, and it is chiefly to this class or type of storage battery that my improvement relates.

In Figs. 1 and 2 is shown a receptacle or chamber A, which supports the active material B, and in Figs. 3 and 4 is shown a receptacle A, active material B, and a conducting or current-collecting plate, sheet, or strip C. Now when a storage battery is in commercial or practical working condition—that is, during the charging and discharging of the current of electricity—the active material undergoes a process of disintegration, and when in this condition is only held loosely together and is liable and does frequently fall away from its supporting medium, thereby tending to cause short-circuiting of the cell and there is a loss of active material, thereby reducing the efficiency of the cell. On looking at Fig. 4 it will readily be seen that the active material can and is liable to fall out from the support-receptacle at the bottom and sides. Referring to Figs. 5 and 6, it will be seen that the conducting plate or sheet C is bent or turned under at the bottom D, completely inclosing or locking the active material B in the receptacle A at D. In Figs. 7 and 8 it will be seen that the conducting or current-collecting plate or sheet C is bent, cast, or turned under at D and also turned, bent, or cast over at the sides E and F, thereby effectually locking or inclosing the active material B in the receptacle, vessel, or chamber A, both at the bottom D and sides E and F.

Figs. 9, 10, 11, 12, and 13 show practically the same thing, only in Fig. 13 we have a pair of the support-receptacles, active material, and conducting-plates placed face to face, which when placed close together in contact with a backing of wood, glass, or other suitable material and held together by rubber bands would form one electrode of the element. The conducting or current-collecting plate, sheet, or strip may be formed so as to attain its object by being bent, cast, or turned under, whichever is most convenient.

The pairs of plates C and supports or receptacles B are not secured together other than by the before-mentioned rubber bands, which secure together a series of pairs.

It is a well-known fact that the active material expands on discharging and contracts on charging, so that there is a tendency for the said material to disintegrate and fall out of its porous receptacle; but with my improved lead plate such action is prevented, as the flanges at the margin of the plate form a sort of telescopic joint, which allows of the expansion and contraction of the active material without permitting it to fall out. This would be impossible with an unflanged lead plate merely fitting within the open side of the porous receptacle. Moreover, the two vertical side flanges and the lower horizontally-flanged edge of my lead plate constitute two vertical conductors and one horizontal conductor of low resistance for the purpose of providing an easy circuit for the current flowing during charge and discharge—that is, I have two vertical conducting sides and one horizontal conducting edge in addition to the lead conducting-surface which is in contact with the plane of the surface of the active material, so that the current will be quickly and evenly distributed throughout the lead sheet itself to the farthest points.

Having now described the nature of my invention, what I claim is—

1. A storage-battery electrode, comprising a porous receptacle filled with the active material, and a conducting plate or sheet having flanges extending beyond the active material and inclosing the edges of the porous receptacle to prevent the escape of the active material, and form vertical and horizontal conducting-surfaces.

2. A storage-battery electrode, consisting of a receptacle in the form of a porous plate having a recessed face filled with the active material, and a conducting-plate having its marginal edges bent inwardly beyond the active material, and inclosing the edges of said plate to prevent the escape of the active material and form vertical and horizontal conducting-surfaces.

In testimony whereof I have affixed my signature in presence of two witnesses.

WILLIAM RUSHTON BOWKER.

Witnesses:
WM. HILTON,
EDWARD D. LORING.